Patented July 6, 1937

2,086,237

UNITED STATES PATENT OFFICE 2,086,237

MANUFACTURE OF FERRIC SULPHATE

Robert Pfanstiel, Cleveland Heights, Ohio, assignor, by mesne assignments, to E. I. du Pont de Nemours & Company, Wilmington, Del., a corporation of Delaware No Drawing. Application August 18, 1934, Serial No. 740,458

16 Claims. (Cl. 23—126)

This invention relates to the manufacture of ferric sulphate from an anhydrous iron sulphate which contains less than three radicals of $SO_4$ per two atoms of iron, and is particularly directed to processes wherein such an iron sulphate is treated with a sulphur trioxide-containing gas to form ferric sulphate. In its more specific aspects my invention is directed to processes wherein the sulphur trioxide-containing gases are taken from a catalytic converter, and wherein the gases after their contact with the iron sulphate are returned to a catalytic converter.

Ferric sulphate has been made heretofore by treating ferrous sulphate with boiling concentrated sulphuric acid. It has also been proposed to make ferric sulphate by first oxidizing ferrous sulphate with air to form basic ferric sulphate, and then treating this basic compound with a limited amount of sulphuric acid in a moisture saturated atmosphere to produce soluble hydrated ferric sulphate. Ferric sulphate has also been made by treating a mixture of ferrous oxide and ferric oxide with oxidizing agents such as manganese dioxide and nitric acid in sulphuric acid.

I have found that ferric sulphate may be economically and expeditiously manufactured from an iron sulphate by contacting the sulphate, at relatively low temperatures, with sulphur trioxide. The manufacture requires only one short step and labor costs are very low. In the more specific aspects of my invention, the manufacture of ferric sulphate can be operated in connection with a sulphuric acid manufacture with even greater economy. Other objects and advantages of my invention will appear hereinafter.

According to my invention anhydrous ferrous sulphate is treated with a gas which contains sulphur trioxide to form a water soluble, anhydrous ferric sulphate. The reaction probably proceeds first:

(1) $2FeSO_4 + SO_3 \rightarrow Fe_2O(SO_4)_2 + SO_2$

The basic ferric sulphate thus produced then reacts:

(2) $Fe_2O(SO_4)_2 + SO_3 \rightarrow Fe_2(SO_4)_3$

Adding Equations 1 and 2 the formation of ferric sulphate from ferrous sulphate may be represented.

(3) $2FeSO_4 + 2SO_3 \rightarrow Fe_2(SO_4)_3 + SO_2$

Although the above reactions are known to be reversible, my process is operated below the temperature at which the reversible effects become important.

The above reactions attribute all of the oxidizing effect to $SO_3$, but the oxygen normally present in converter gases will act, at fairly high temperatures, to oxidize ferrous sulphate thus:

(4) $4FeSO_4 + O_2 \rightarrow 2Fe_2O(SO_4)_2$

The basic ferric sulphate will then react as in Equation 2 to form ferric sulphate.

As is seen in Equation 2, the product may be considered as resulting from a reaction between basic ferric sulphate and sulphur trioxide. I may, accordingly, use basic ferric sulphate as a starting material for the manufacture of ferric sulphate. The basic ferric sulphate may conveniently be made by furnacing ferrous sulphate in the presence of air, but I may use basic ferric sulphate from any source.

As is seen above, I may use iron sulphates which contain less than three radicals of $SO_4$ per two atoms of iron, such as ferrous sulphate and basic ferric sulphate. Obviously I may use mixtures of iron sulphates.

In practice I usually prefer to employ the effluent gases from a catalytic sulphuric acid converter, preferably from a first converter. In the manufacture of sulphuric acid, sulphur is burned to sulphur dioxide with a large excess of air. The gas mixture is then run through a catalytic converter wherein part of the sulphur dioxide is oxidized. The effluent gases contain free oxygen, sulphur dioxide, and sulphur trioxide. It is ordinarily necessary to run these gases through a second converter more completely to oxidize the sulphur dioxide.

My ferric sulphate manufacture may be conveniently interposed between the first sulphuric acid converter and subsequent converters, any sulphur dioxide formed in treating the iron sulphate, as in Equation 3 above, being oxidized in a subsequent converter with other unoxidized sulphur dioxide. Of course, part of the sulphur dioxide-containing gases from the ferric sulphate manufacture can be recycled to the converter, but this type of procedure does not fit into a sulphuric acid manufacture and for that reason is not particularly desirable. It will be readily understood that sulphur trioxide from any source may be used for the treatment of iron sulphates according to my invention.

The manufacture of ferric sulphate in connection with sulphuric acid manufacture is particularly advantageous both because of the fact that the reactions above given which lead to ferric sulphate are exothermic, and because of the fact that the effluent converter gases are at a relatively high temperature. A ferric sulphate manufacture interposed between a first and second converter, therefore, can be conducted without the application of external heat.

The temperatures at which the treatment of iron sulphate with sulphur trioxide is performed may vary widely. If too low a temperature be employed the reaction proceeds slowly, while if too high a temperature be used the efficiency of the treatment may fall off by reason of decomposition of ferric sulphate. Generally, I prefer to operate between about 100° and 600° C., while more specifically I prefer to employ temperatures between about 200° and 550° C.

Any type of equipment may be employed for treating iron sulphate with sulphur trioxide. I have found that a rotatable drum, provided with blades for agitating and advancing the material, is quite satisfactory. The iron sulphate is continuously fed into one end of the drum, and moved gradually to the opposite end. A gas containing sulphur trioxide is led into the end of the drum where the solid material is discharged, the gas flowing counter-currently to the solid material. The heat of the reaction maintains the desired temperature, and it may be necessary to provide for considerable heat radiation to keep the temperature from rising too high. Of course, suitable heating and/or cooling means may be provided if desired.

The following specific examples will more clearly illustrate the practice of my invention:

*Example 1.*—Copperas ($FeSO_4.7H_2O$) was first dehydrated at 470° C. A gas which contained 8% $SO_3$ was then passed, at room temperature, over the dehydrated material for 25 minutes.

*Example 2.*—A gas from a catalytic converter, containing 8% $SO_3$, was run through anhydrous ferrous sulphate for four hours. The effluent gases were further oxidized in a second catalytic converter. The ferric sulphate manufacture was carried out at about 365° C. As it is known that anhydrous ferric sulphate often dissolves slowly and with difficulty in water the anhydrous ferric sulphate obtained was added to cold water to determine its solubility properties. 96.75% of the solid rapidly passed into solution and 3.25% remained undissolved.

While I have noted a number of specific procedures and conditions I do not intend to be restricted thereby, the scope of my invention being set forth in the appended claims.

I claim:

1. In a process for the manufacture of ferric sulphate, the step comprising treating with sulphur trioxide an anhydrous iron sulphate selected from the group consisting of ferrous sulphate and basic ferric sulphate.

2. In a process for the manufacture of ferric sulphate, the step comprising treating anhydrous basic ferric sulphate with sulphur trioxide.

3. In a process for the manuacture of ferric sulphate, the step comprising treating anhydrous ferrous sulphate with sulphur trioxide.

4. In a process for the manufacture of ferric sulphate, the step comprising treating an anhydrous iron sulphate selected from the group consisting of ferrous sulphate and basic ferric sulphate with sulphur trioxide at a temperature of about 200° to 550° C.

5. In a process for the manufacture of ferric sulphate, the step comprising treating in countercurrent manner an anhydrous ferrous sulphate with sulphur trioxide at about 200° to 550° C.

6. In a process for the manufacture of ferric sulphate in conjunction with a sulphuric acid manufacture which employs at least two catalytic converters, the step comprising passing effluent gases from one converter in contact with an anhydrous iron sulphate selected from the group consisting of ferrous sulphate and basic ferric sulphate as the said gases are led to a second converter.

7. In a process for the manufacture of ferric sulphate in conjunction with a sulphuric acid manufacture which employs at least two catalytic converters, the step comprising passing effluent gases from one converter in contact with an anhydrous ferrous sulphate as the said gases are led to a second converter.

8. In a process for the manufacture of ferric sulphate in conjunction with a sulphuric acid manufacture which employs at least two catalytic converters, the step comprising passing effluent gases from one converter in contact with an anhydrous basic ferric sulphate as the said gases are led to a second converter.

9. In a process for the manufacture of ferric sulphate, the step comprising treating a dry iron sulphate from the group consisting of ferrous sulphate and basic ferric sulphate with sulphur trioxide and oxygen.

10. In a process for the manufacture of ferric sulphate, the step comprising treating a dry iron sulphate from the group consisting of ferrous sulphate and basic ferric sulphate with sulphur trioxide and oxygen, the treatment being accomplished at a temperature between about 100° and 600° C.

11. In a process for the manufacture of ferric sulphate, the step comprising treating a dry iron sulphate from the group consisting of ferrous sulphate and basic ferric sulphate with sulphur trioxide and oxygen, the treatment being accomplished at a temperature between about 200° and 550° C.

12. In a process for the manufacture of ferric sulphate the step comprising treating dry ferrous sulphate with sulphur trioxide and oxygen.

13. In a process for the manufacture of ferric sulphate the step comprising treating dry ferrous sulphate with sulphur trioxide and oxygen, the treatment being accomplished at a temperature between about 200° and 550° C.

14. In a process for the manufacture of ferric sulphate the step comprising treating dry basic ferric sulphate with sulphur trioxide and oxygen.

15. In a process for the manufacture of ferric sulphate the step comprising treating dry basic ferric sulphate with sulphur trioxide and oxygen, the treatment being accomplished at a temperature between about 200° and 550° C.

16. In a process for the manufacture of ferric sulphate in conjunction with a sulphuric acid manufacture, the step comprising passing the effluent sulphur trioxide-oxygen-containing gases from a catalytic converter in contact with a dry iron sulphate from the group consisting of ferrous sulphate and basic ferric sulphate to produce dry ferric sulphate.

ROBERT PFANSTIEL.